United States Patent [19]
Feuz

[11] 3,856,118
[45] Dec. 24, 1974

[54] BRAKE SYSTEM FOR A TRAVELLING BRAKE CARRIAGE OF AN AERIAL CABLEWAY

[75] Inventor: Fritz Feuz, Bern, Switzerland

[73] Assignee: Von Roll AG Werk Bern, Bern, Switzerland

[22] Filed: Feb. 20, 1973

[21] Appl. No.: 333,696

Related U.S. Application Data

[63] Continuation-in-part of Ser. No. 118,395, Feb. 24, 1971, Pat. No. 3,722,632.

[30] Foreign Application Priority Data
Dec. 17, 1970 Switzerland.................... 18749/70

[52] U.S. Cl.................................. 188/42, 188/170
[51] Int. Cl............................................. B61h 9/02
[58] Field of Search.............................. 188/41–44, 188/170

[56] References Cited
UNITED STATES PATENTS

| | | | |
|---|---|---|---|
| 1,776,765 | 9/1930 | Ferris.............................. | 188/42 X |
| 3,097,723 | 7/1963 | Schaler............................ | 188/42 |
| 3,369,501 | 2/1968 | Tsuchimochi..................... | 188/42 X |
| 3,486,592 | 12/1969 | Kolk et al........................ | 188/44 X |

FOREIGN PATENTS OR APPLICATIONS

| | | | |
|---|---|---|---|
| 218,064 | 11/1961 | Austria............................ | 188/42 |
| 197,862 | 5/1958 | Austria............................ | 188/42 |

Primary Examiner—Duane A. Reger
Attorney, Agent, or Firm—Werner W. Kleeman

[57] ABSTRACT

A brake system for a travelling brake carriage of an aerial cableway, the travelling brake carriage embodying a brake carriage body and a housing provided with a braking spring accumulator. A piston and cylinder arrangement is operatively associated with the braking spring accumulator. The cylinder has a compartment for a braking fluid medium, and the braking spring accumulator applies a braking force to such fluid medium via the piston and cylinder arrangement. At least one braking block is supported by the brake carriage body, said braking block being provided with cooperating pairs of braking shoes, one shoe of each pair being arranged to each side of the associated supporting cable. A respective sliding piston acts upon each braking shoe. Means are provided for transmitting the pressure of the fluid medium within the piston and cylinder arrangement against the braking shoes in a direction urging the latter into a braking position towards the associated support cable, and means are provided for applying a counterforce against the braking shoes in a direction opposite to the braking urging action exerted by the fluid medium of the piston and cylinder arrangement.

9 Claims, 5 Drawing Figures

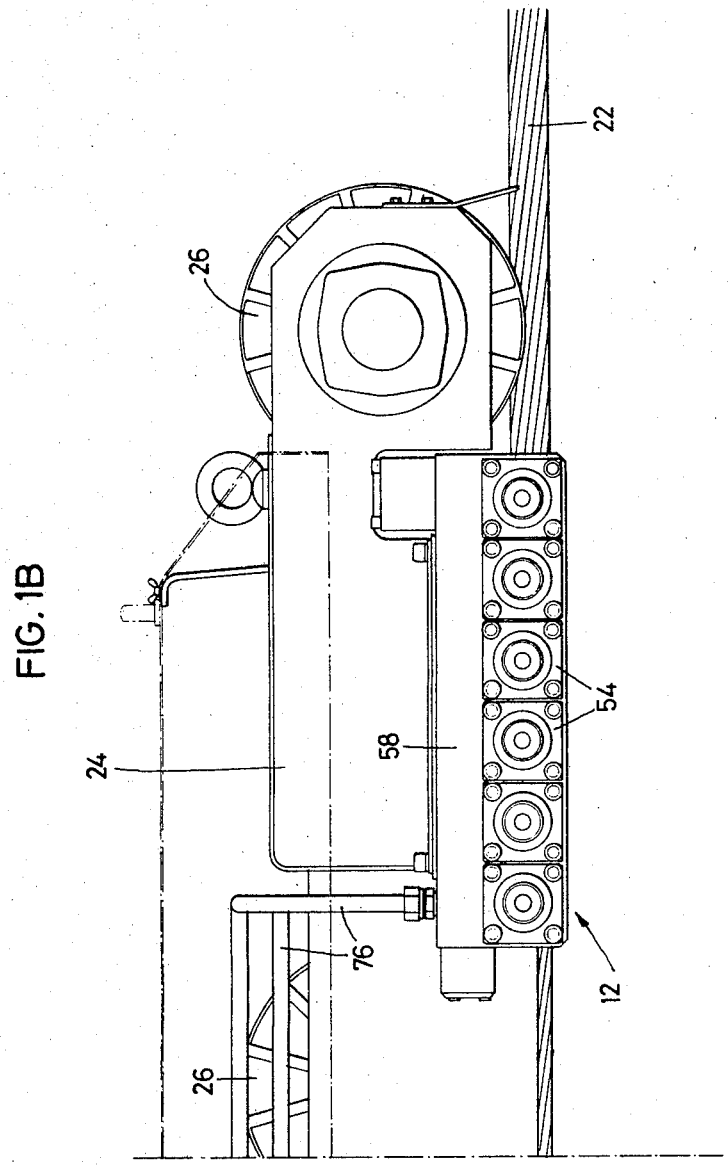

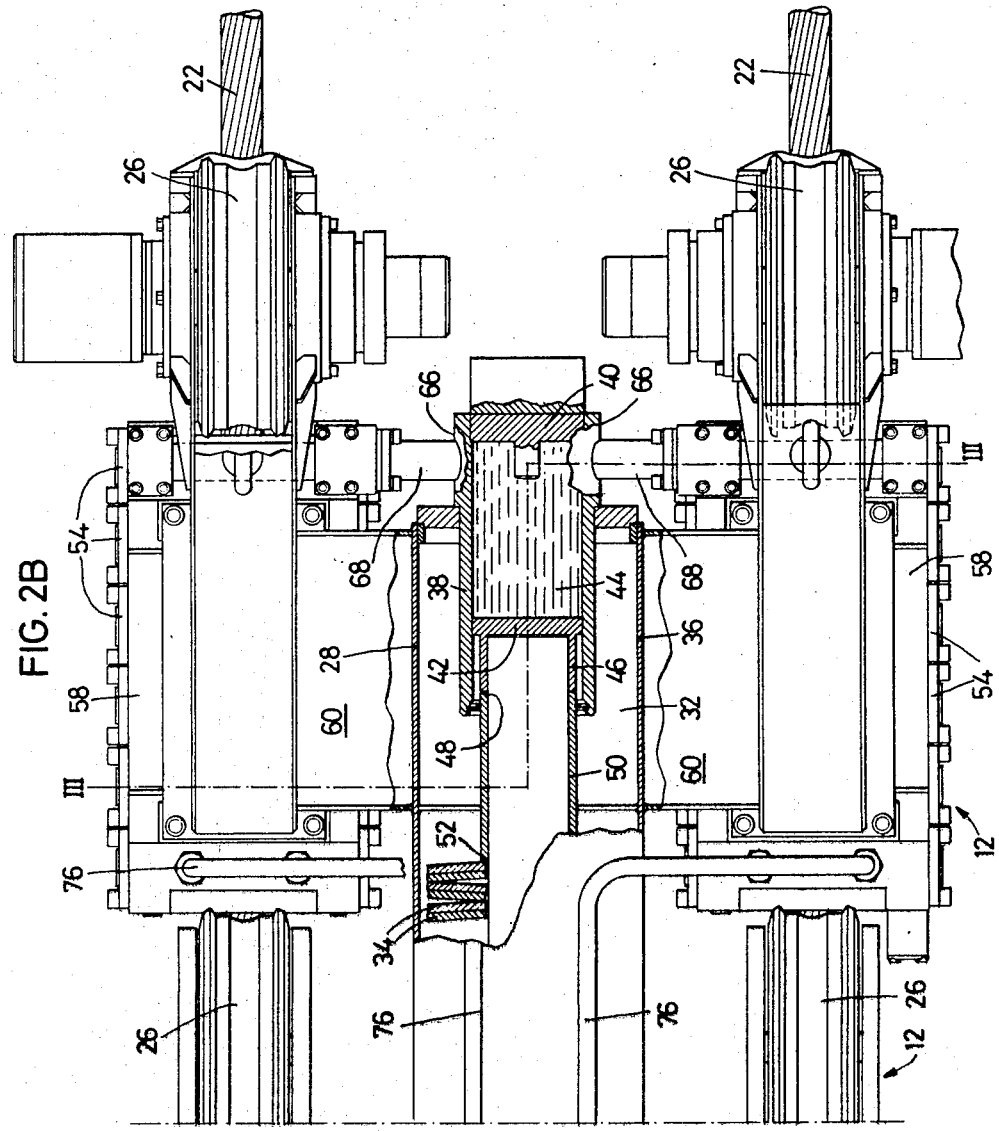

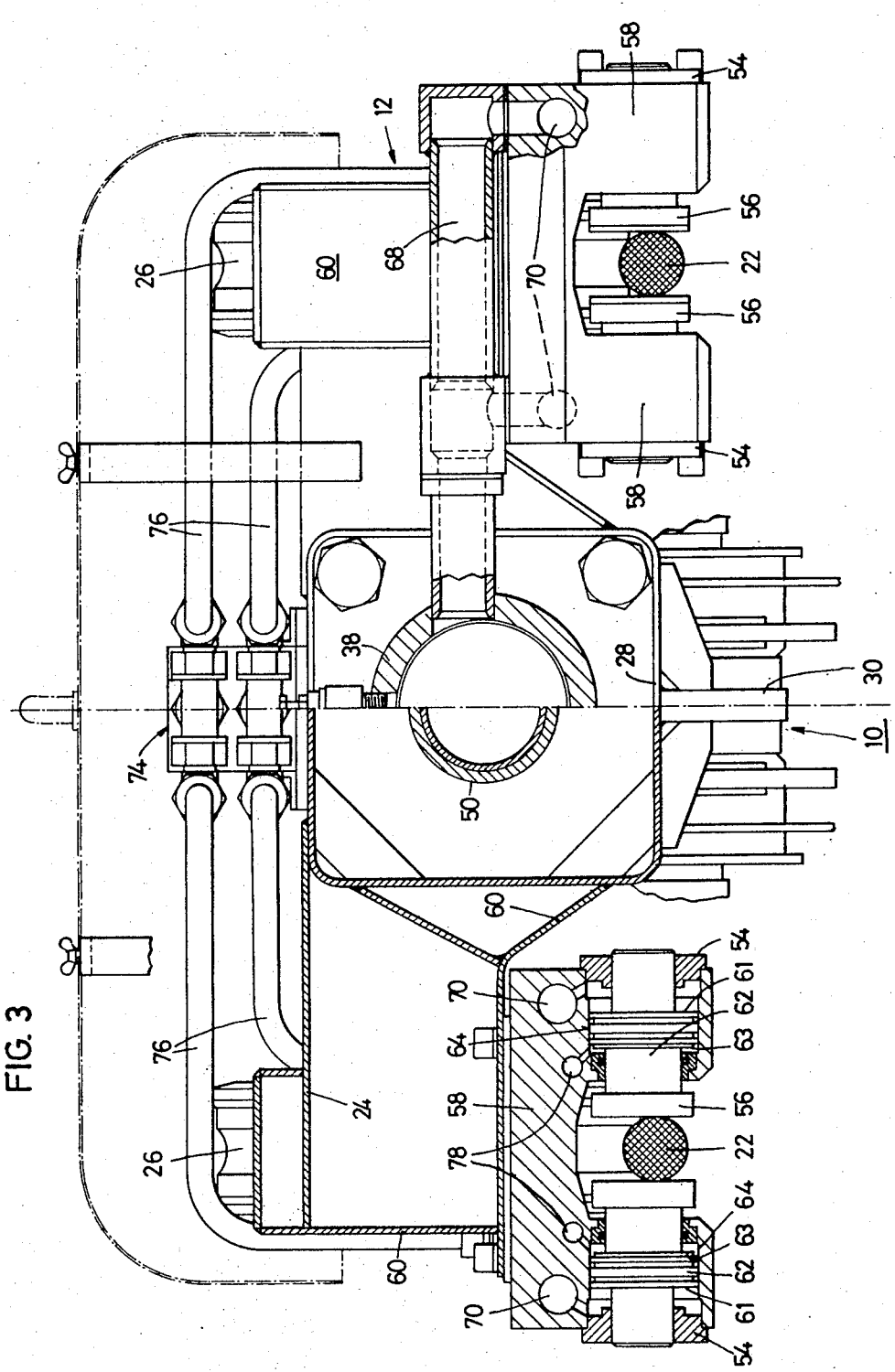

BRAKE SYSTEM FOR A TRAVELLING BRAKE CARRIAGE OF AN AERIAL CABLEWAY

CROSS-REFERENCE TO RELATED CASE

The instant application is a continuation-in-part application of my commonly assigned, copending United States application, Ser. No. 118,395, filed Feb. 24, 1971, now U.S. Pat. No. 3,722,632 granted Mar. 27, 1973, "Travelling Carriage Mechanism for Aerial Cable Cars."

BACKGROUND OF THE INVENTION

The present invention relates to a new and improved brake system for a travelling brake carriage of the type employed in conjunction with a travelling support carriage of a travelling carriage mechanism for aerial cable cars or the like, especially swinging aerial cable cars.

As explained in my aforementioned copending United States application, prior art aerial cableways employed brake mechanisms which are located at a travelling carriage in the lengthwise direction thereof and between support rollers. To overcome the therein mentioned problem associated with the prior art aerial cableway constructions of the aforementioned type, there has been taught in such copending application a travelling carriage mechanism incorporating a travelling support carriage and a travelling brake carriage pivotably connected with one end of the travelling support carriage.

SUMMARY OF THE INVENTION

It is a primary object of the present invention to provide a new and improved construction of brake system for a travelling brake carriage employed with a travelling support carriage in a travelling carriage mechanism of the type disclosed in my aforementioned United States application.

Another and more specific object of the present invention relates to a new and improved construction of brake system for a travelling brake carriage for an aerial cableway which is relatively simple in construction and design, extremely reliable in operation, not readily subject to malfunction and breakdown, and requires a minimum of servicing and maintenance, but when servicing and maintenance are necessary, permits same to be performed readily simply.

Now in order to implement these and still further objects of the invention, which will become more readily apparent as the description proceeds, the invention contemplates a brake system for a travelling brake carriage employed in conjunction with a travelling support carriage of an aerial cableway wherein the travelling brake carriage is provided with a braking spring accumulator. If it is assumed that the serial cableway employs a pair of support or track cables for the travelling support carriage and the travelling brake carriage, then to each side of the braking spring accumulator there is arranged a respective braking block. Each braking block is equipped with a plurality of cooperating pairs of braking shoes arranged to opposite sides of the associated support or track cable. Double-acting horizontally opposed pistons slide in bores of the associated braking block, each such piston cooperating with one of the braking shoes. The braking spring accumulator transmits a closing pressure through the agency of a fully enclosed grease system to one respective side or face of the pistons and thus to the braking shoes so as to urge these braking shoes against the associated support or track cable. The opposite respective side or face of the pistons is exposed to the pressure of a high pressure oil system which opposes the pressure exerted by the pistons upon the braking shoes during such time as the brake is to be maintained in a released position. During normal operating conditions these pistons and their associated brake shoes are always is an open position due to an overpressure existing at the oil side of the brake system and which opposes the closing or braking action of the brake shoes. Should a condition arise that requires braking of the travelling brake carriage and therefore the aerial cableway, such as failure of the haul rope or intentional release of the brake system, then the oil pressure is instantaneously reduced and the brakes i.e. brake shoes automatically applied.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1A and 1B together are an elevational view of a travelling carriage mechanism for an aerial cable car or the like employing a travelling support carriage and a travelling brake carriage equipped with the brake system of this development;

FIGS. 2A and 2B together are a top plan view of the arrangement depicted in FIG. 1; and FIG. 3 is a cross-sectional view of the arrangement of FIGS. 2A, 2B taken substantially along the line III—III of FIG. 2B.

DETAILED DESCRIPTION OF THE PREFERRED EMBODIMENTS

Figure 1A:
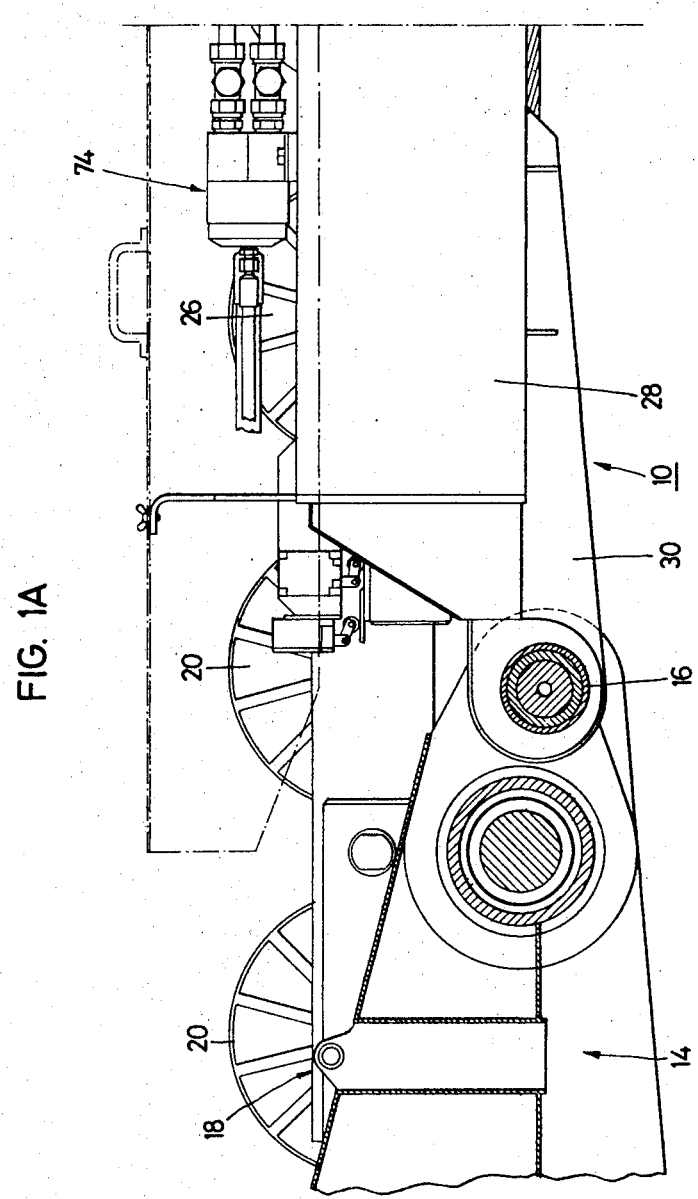

Considering now the drawings, in the embodiment under consideration there is assumed, purely by way of illustration and not limitation, that the therein depicted travelling carriage mechanism, generally indicated by reference character 10, is used for a double cable reversible aerial passenger cableway, although it is possible to employ the concepts of the invention with a single cable aerial cableway. Further, although the features of the invention which are considered to be novel are concerned with the braking system for the travelling brake carriage or trolley 12, there will be initially considered enough of the construction of the travelling carriage mechanism 10 to provide sufficient background for fully understanding the environment of use of the inventive brake system. Further details of the travelling carriage mechanism can be, of course, readily obtained by referring to my aforementioned copending United States application, Ser. No. 118,395, now U.S. Pat. No. 3,722,632.

Figure 2A:
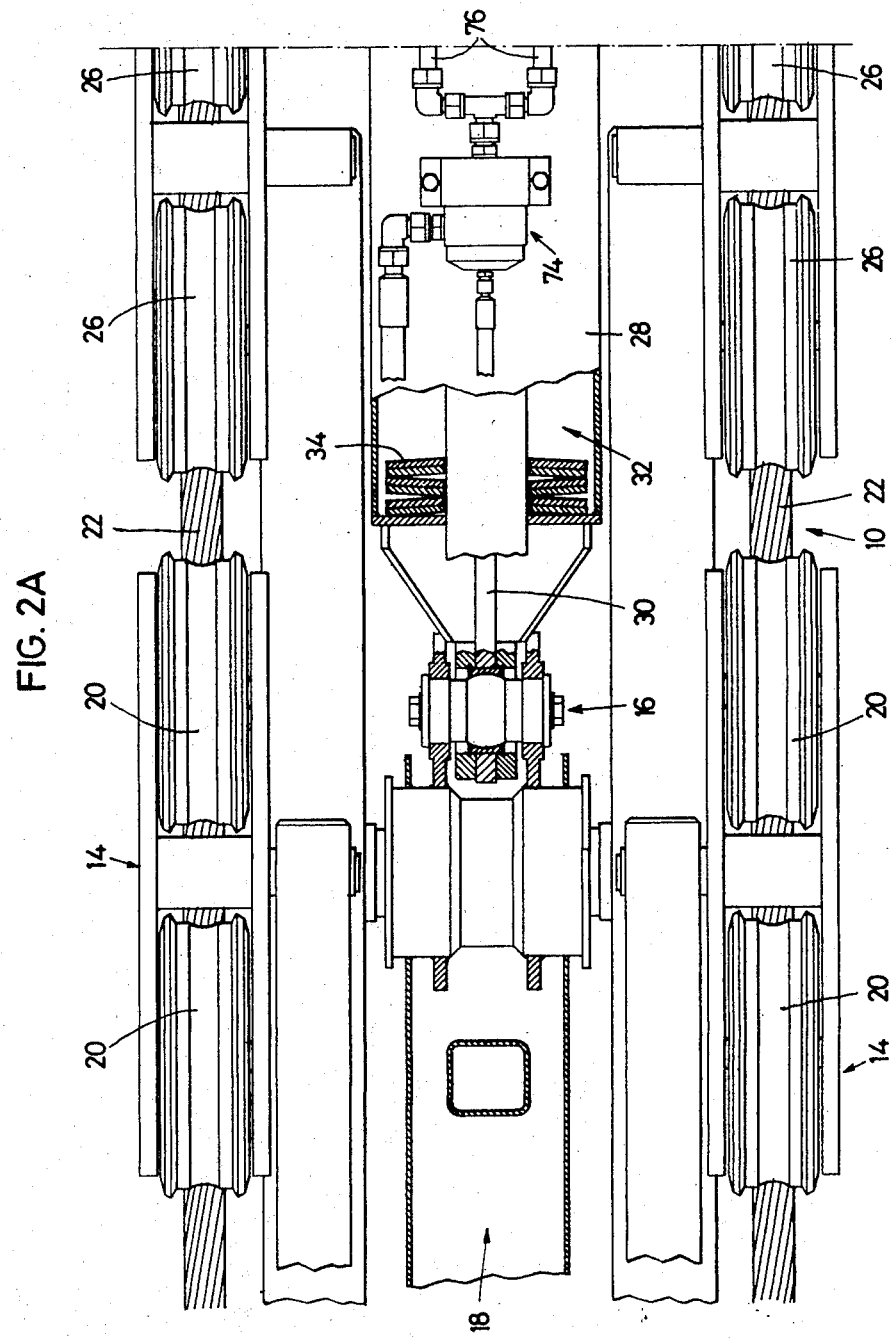

Turning attention then initially to FIGS. 1A, 1B and 2A, 2B of the drawings, the therein depicted travelling carriage mechanism 10 will be understood to comprise a travelling support carriage 14 coupled by means of a suitable coupling mechanism 16 with the travelling brake carriage 12. To simplify the illustration in the drawings, only the rear portion 18 of the travelling support carriage 14, to which there is coupled the travelling brake carriage 12, has been depicted. The travelling support carriage 14 is provided with a series of support rollers or rolls 20 intended to travel upon the two support cables or track ropes 22. The travelling support carriage 14 is not equipped with any brake system, rather only the travelling brake carriage 12 possesses a brake system, as will be more fully explained shortly hereinafter.

Considering now the travelling brake carriage 12, such will be recognized to constitute a brake carriage body or main support structure 24 equipped at both sides with support rolls 26 extending in the lengthwise direction of the brake carriage body. These support rolls 26 likewise ride upon the support or track cables 22. The brake carriage body or main structure 24 is provided with a central hollow housing 28 extending along and symmetrically of the lengthwise axis of the travelling brake carriage 12 and at the underside of which there is secured an arm or overhang beam 30 by means of which the travelling brake carriage 12 may be coupled via the coupling mechanaism 16 with the rear end 18 of the travelling support carriage 14. This central housing 28 serves to accommodate a central braking spring accumulator, generally indicated by reference character 32, and acts as a central supporting column. Within this housing there are arranged in the lengthwise direction thereof resilient means in the form of a package of springs 34 of the central braking spring accumulator 32.

At the end 36 of the hollow housing 28 remote from the travelling carriage mechanism 14 there is supported a hollow cylinder 38 closed at its end 40 and within which there is displaceably arranged a piston 42. Within the cylinder compartment 44 there is contained a suitable medium for exerting the braking force, and such medium is typically grease which is resistant to freezing of a fully enclosed grease system to be discussed more fully hereinafter. The piston 42 is provided with a rearwardly extending piston skirt 46 directed away from the grease compartment 44 and against which acts one end 48 of a collar or sleeve 50, the opposite end 52 of which contacts the package of springs 34 and is urged by the latter against the piston 42 to thus advance such into the compartment 44 of the cylinder 38 so as to continuously apply pressure to the grease of the enclosed grease system which acts upon suitable braking mechanisms 54, typically embodying braking shoes 56 or equivalent structure of the brake system.

It is to be understood that for each support or track cable 22 there is provided a braking block 58 which is supported by the travelling brake carriage 12. Since the system under consideration is assumed to be a double cable-aerial cableway two such braking blocks 58 are provided, each to one side of the central longitudinally extending housing 28 of the central braking spring accumulator 32. Each such braking block 58 may be secured to the confronting side of the central housing 28 and the main structure or brake carriage body 24 by suitable supporting brackets 60. Now as best seen by referring to FIGS. 1 and 3, each braking block 58 carries a number of cooperating pairs of oppositely situated braking shoes 56, one shoe of each such cooperating pair being arranged at one side of the associated supporting or track cable 22 and the other shoe of the same pair at the opposite side thereof, as particularly well seen by referring to FIG. 3. In a typical system employing two braking blocks 58 twelve such pairs of braking shoes 56 may be provided, six pairs at each braking block. Now for each braking shoe 56 there is provided a displaceable piston 62 which is slidably movable within an associated bore 64 of the relevant braking block 58. The central spring accumulator 32 keeps all of these pistons 62 permanently under a maximum closing pressure by means of the fully enclosed grease system. To that end, the hollow grease cylinder 38 is provided at opposed sides 66 with the radially extending conduits 68 of the grease system and which conduits extend almost up to the region of the outermost ends of each associated braking block 58. These radially extending conduits 68 open into a number of channels 70. There are typically provided the same number of channels 70 as there are provided sliding pistons 62 and braking shoes 56, and each such channel 70 communicates with one face 61 of the associated sliding piston 62 so as to urge the therewith cooperating braking shoe 56 towards and into contact with the associated support cable 22. In this way the force of the package of springs 34 which acts via the collar 50 upon the grease piston 42 is transmitted to the grease within the cylinder compartment 44 in order to generate the requisite braking force for the braking shoes 56. This braking force is then transmitted by means of the pressurized medium, i.e., grease via the conduits 68 and channels 70 to the sliding pistons 62 and thus to the associated braking shoes 56 to thereby exert maximum closing pressure upon these pistons 62 and their associated braking shoes 56.

Mechanism is also provided for subjecting the respective opposite face or side 63 of the sliding pistons 62 to the pressure of a high pressure oil system, generally indicated by reference character 74. Details of the high pressure oil system and its control do not constitute subject matter of this development but are disclosed in the copending U.S. application of Hans Gfeller, Ser. No. 143,690, filed May 12, 1971, and entitled "Braking Systsem". In any event, this high pressure oil system 74 feeds oil under a high pressure via the conduits 76 and channels 78 to the opposite faces 63 of the sliding pistons 62 of the brake shoes 56. Here again there may be provided the same number of channels 78 as are provided sliding pistons 62 and brake shoes 56.

Thus, on the one hand, the central spring accumulator 32 keeps all of the sliding pistons 62 exposed at one respective face 61 thereof to a maximum closing pressure exerted by the fully enclosed grease system, whereas the opposite faces 63 of these sliding pistons 62 are exposed to the oil pressure delivered from the high pressure oil system 74 via the conduits 76 and channels 78. During normal operating conditions the sliding pistons 62 and their associated brake shoes 56 are always in an open position due to an overpressure prevailing at the oil side of the sliding pistons. If a condition should arise requiring braking of the aerial cableway, for instance due to failure of the haul rope connected with the travelling carriage mechanism or if intentional release of the brakes is intended, then, the oil pressure acting in opposition to the braking pressure exerted by the sliding pistons by virtue of the action of the grease system is instantaneously reduced and the brake shoes 56 of the brake mechanisms 54 are automatically applied, as depicted in FIG. 3. As a result, the brake system becomes functional for braking the aerial cableway.

While there is shown and described present preferred embodiments of the invention, it is to be distinctly understood that the invention is not limited thereto, but may be otherwise variously embodied and practiced within the scope of the following claims. Accordingly,

What is claimed is:

1. A brake system for a travelling brake carriage operatively connected with a travelling support carriage of an aerial cableway equipped with at least one support cable for supporing said travelling support carriage and said travelling brake carriage, the improvement comprising said travelling brake carriage embodying a brake carriage body, a housing extending in the lengthwise direction of the travelling brake carriage, said housing being provided with a braking spring accumulator, a piston and cylinder arrangement operatively associated with said braking spring accumulator, said cylinder having a compartment containing a first braking fluid medium, said braking spring accumulator continually applying a braking force upon said first fluid medium via said piston and cylinder arrangement, at least one braking block supported by said brake carriage body, said braking block being provided with cooperating pairs of braking shoes, the shoes of each pair being arranged to respective opposite sides of the associated support cable, a respective double-acting piston member having first and second opposed faces acting upon each braking shoes, unobstructed means for transmitting the pressure of the first fluid medium within the piston and cylinder arrangement against said first face of each of said double-acting piston members and thereby against the braking shoes in a direction urging the latter into a braking position towards the associated support cable, and means for continually applying a counterforce against the braking shoes in a direction opposite to the urging force exerted by the first fluid medium of the piston and cylinder arrangement, said means for applying a counterforce including means for controllably feeding a second fluid medium at a pressure greater than the pressure of the first fluid medium against said second face of each of said double-acting piston members.

2. The brake system as defined in claim 1, wherein said braking spring accumulator contains spring means acting upon the piston of said piston and cylinder arrangement.

3. The brake system as defined in claim 1, wherein said braking block is provided with bores extending substantially radially with respect to said support cable, each of said double acting piston members being slidably arranged in one of said bores and cooperating with an associated braking shoe.

4. The braking system as defined in claim 3, wherein said means for applying a counterforce to the braking shoes incorporates conduit means for feeding pressurized oil to said second face of each sliding double acting piston member.

5. The braking system as defined in claim 1, wherein said housing is arranged at the region of the lengthwise axis of the travelling brake carriage and substantially symmetrically with respect thereto.

6. The brake system as defined in claim 1, wherein a pair of support cables is provided for supporting the travelling support carriage and the travelling brake carriage, said travelling brake carriage being provided with one such braking block for each such support cable, each braking block being equipped with said cooperating pairs of brake shoes, one of the brake shoes of a pair being arranged to one side and the other of the same pair to the opposite side of the associated support cable, each braking block being provided with a bore for each associated brake shoe, a respective sliding piston member defining said double-acting piston members arranged in each bore and cooperating with an associated brake shoe.

7. The brake system as defined in claim 6, wherein said means for controllably feeding a second fluid medium incorporates an oil conduit system for feeding oil under pressure to the double-acting piston members in the bores of the braking block for urging the associated braking shoes in a direction away from the associated support cable.

8. The braking system as defined in claim 7, wherein said transmitting means incorporates conduit means flow communicating with said first face of each of the double-acting piston members within the bores for urging such double-acting piston members in a direction towards the associated support cable.

9. A brake system for a travelling brake carriage of an aerial cableway equipped with at least one support cable for supporting said travelling brake carriage, the improvement comprising said travelling brake carriage embodying a brake carriage body, a housing extending in the lengthwise direction of the travelling brake carriage, said housing being provided with a braking spring accumulator, a piston and cylinder arrangement operatively associated with said braking spring accumulator, said cylinder having a compartment containing a first braking fluid medium, said braking spring accumulator continually applying a braking force upon said first fluid medium via said piston and cylinder arrangement, at least one braking block supported by said brake carriage body, said braking block being provided with cooperating pairs of braking mechanisms, the braking mechanisms of each pair being arranged to respective opposite sides of the associated support cable, means for transmitting the pressure of the first fluid medium within the piston and cylinder asrrangement against the braking mechanisms in a direction urging the latter into a braking position towards the associated support cable, and means for continually applying a counterforce against the braking mechanisms in a direction opposite to the urging force exerted by the first fluid medium of the piston and cylinder arrangement, said means for applying a counterforce including means for controllably feeding a second fluid medium at a pressure greater than the pressure of the first fluid medium against the braking mechanisms, said counterforce being sufficient to normally maintain said braking mechanisms in a non-braking position during proper functioning of said aerial cableway.

* * * * *